United States Patent
Lee et al.

(10) Patent No.: US 11,435,918 B2
(45) Date of Patent: Sep. 6, 2022

(54) MODULE MOUNTED IN SERVER TO SHARE BLOCK-LEVEL STORAGE AND RESOURCE

(71) Applicant: NCLOUD Co., Ltd, Samcheok-si (KR)

(72) Inventors: Dong Soo Lee, Gimpo-si (KR); Won Hun Kim, Seoul (KR)

(73) Assignee: NCLOUD CO., LTD, Samcheok-si (KR)

( * ) Notice: Subject to any disclaimer, the term of this patent is extended or adjusted under 35 U.S.C. 154(b) by 0 days.

(21) Appl. No.: 17/085,298

(22) Filed: Oct. 30, 2020

(65) Prior Publication Data
US 2021/0311630 A1    Oct. 7, 2021

(30) Foreign Application Priority Data

Apr. 3, 2020   (KR) .................. 10-2020-0041043
Sep. 14, 2020  (KR) .................. 10-2020-0117909

(51) Int. Cl.
*G06F 3/06*    (2006.01)
*G06F 13/42*   (2006.01)
(Continued)

(52) U.S. Cl.
CPC .............. *G06F 3/064* (2013.01); *G06F 3/067* (2013.01); *G06F 3/0608* (2013.01); *G06F 3/0631* (2013.01); *G06F 13/4221* (2013.01); *G06F 13/4282* (2013.01); *H04L 49/357* (2013.01); *H04L 67/1097* (2013.01);
(Continued)

(58) Field of Classification Search
CPC ...... G06F 3/064; G06F 3/0608; G06F 3/0631; G06F 3/067; G06F 13/4221; G06F 13/4282; H04L 49/357; H04L 67/1097
See application file for complete search history.

(56) References Cited

U.S. PATENT DOCUMENTS

| 7,111,138 B2 * | 9/2006 | Higaki ............. G06F 3/0607 707/999.202 |
| 8,806,096 B1 * | 8/2014 | Patil ............... G06F 3/0689 710/74 |

FOREIGN PATENT DOCUMENTS

| KR | 20080054593 | 6/2008 |
| KR | 20140061194 | 5/2014 |
| KR | 101564712 | 11/2015 |

OTHER PUBLICATIONS

Korean Office Action—Korean Application No. 10-2020-0041043 dated Aug. 4, 2020, citing KR 10-1564712, KR 10-2008-0054593, and KR 10-2014-0061194.

* cited by examiner

Primary Examiner — Tammara R Peyton
(74) Attorney, Agent, or Firm — Cantor Colburn LLP (57) ABSTRACT

Provided is a module mounted in a server to share a block-level storage and resources. The module includes: a HBA card unit for connection to an external server; an internal disk unit providing a storage space inside a server; a setting unit allocating the storage space of the internal disk unit; a target driver unit implementing a SCSI protocol, communicating with the external server and setting volumes to a storage mode or a server mode; and a target core unit routing data of the internal disk unit and the target driver unit depending on the storage mode or the server mode. The storage mode allows the volumes to be used as a storage of the external server. The server mode allows the volumes to be used as a storage inside the server. The target driver unit can switch the volumes from the server mode to the storage mode.

12 Claims, 9 Drawing Sheets

(51) Int. Cl.
*H04L 49/356* (2022.01)
*H04L 67/1097* (2022.01)
(52) U.S. Cl.
CPC .............. *G06F 2213/0026* (2013.01); *G06F 2213/0028* (2013.01); *G06F 2213/0032* (2013.01); *G06F 2213/0036* (2013.01)

MODULE MOUNTED IN SERVER TO SHARE BLOCK-LEVEL STORAGE AND RESOURCE

TECHNICAL FIELD

The present disclosure relates to a module mounted in a server to share a block-level storage and resources.

BACKGROUND

Block storage is a type of data storage that involves storing data in consistently-sized, easily accessible blocks. Block storage refers to data storage that is used to store files in evenly-sized blocks and is suitable for data that is frequently accessed and edited. Also, block storage is the most common type of data storage and is mainly used in storage area network (SAN) environments.

A conventional data center has an architecture including a host as a first layer, a storage switch or a storage area network (SAN) switch as a second layer, and a storage area network (SAN) and network attached storage (NAS) array controller as a third layer.

The above-described architecture offers centralized integrated storage resources at block and file levels and also performs data management in a single place by using a storage controller. Therefore, a server for operation is further needed.

Also, since the conventional architecture further needs a server, it has complexity as a platform.

Further, conventional block-level storage is a solution for high availability and high performance applications. Network attached storage (NAS) has offered a simple and inexpensive way to share files throughout a company for a long time, but has problems such as frequent network failures and bottlenecks.

Furthermore, the storage area network (SAN) can be more strongly and easily expanded to an application such as a database with high transaction volume, but it is highly costly and needs more servers.

Moreover, NAS and SAN data storage schemes are allowed only to add storage capacity even when wanting to add computing performance.

SUMMARY

In view of the foregoing, the present disclosure provides a module mounted in a server to share a block-level storage and resources and capable of solving the conventional problem of adding a server for operation.

Also, in view of the foregoing, the present disclosure provides a module mounted in a server to share a block-level storage and resources and capable of solving the conventional problem of traffic collision between systems sharing storage via a network.

However, the problems to be solved by the present disclosure are not limited to the above-described problems. There may be other problems to be solved by the present disclosure.

According to an aspect of the present disclosure, there is provided a module mounted in a server to share a block-level storage and resources, including: a HBA card unit for connection to an external server; an internal disk unit in which a plurality of internal disks is mounted and which provides a storage space inside a server; a setting unit configured to allocate the storage space of the internal disk unit in a plurality of volumes according to a control command of a server manager; a target driver unit configured to implement a SCSI protocol, communicate with the external server connected to the HBA card unit and set the volumes to a storage mode or a server mode according to a control command of the server manager; and a target core unit configured to route data of the internal disk unit and the target driver unit by processing a SCSI command depending on the storage mode or the server mode, and the storage mode is a mode that allows the volumes to be used as a storage of the external server according to a control command of the server manager, and the server mode is a mode that allows the volumes to be used as a storage inside the server, and the target driver unit is able to switch the volumes from the server mode to the storage mode, which enables access to data depending on control of the external server, according to a control command of the server manager.

Further, the target driver unit is able to switch the volumes from the server mode to the storage mode, which enables access to data depending on control of the external server, according to a control command of an external server manager and switch the volumes to the server mode according to a control command of the external server manager.

Furthermore, the setting unit may allocate a volume of the internal disk unit, which is targeted by a SCSI protocol, at a block level and set LUNs for the allocated volumes.

Moreover, the internal disk unit may further include a RAID card to increase the number of internal disks to be mounted.

Also, a transfer protocol between the HBA card and the external server may be any one of Fiber Channel Target, Infiniband Target, iSCSI Target, Hardware FCoE Target, ISCSI over TCP, IP, SRP over Infiniband, iSER over IB, RoCE, iWARP and Software FCoE Target.

The module mounted in a server to share a block-level storage and resources may further include a NIC unit for network connection to another system.

Also, the module mounted in a server to share a block-level storage and resources may further include a device-type-specific driver unit configured to assist data processing by analyzing a data request, determining a parameter and specifying the type of a device.

Further, the target core unit may be any one of a SCSI device, a block device, a file and a RAID controller.

Furthermore, the target driver unit may further set the volumes to an auto mode according to a control command of the server manager, and the auto mode may be a mode in which the volumes are set to the storage mode or the server mode depending on an available storage of the server or the external server.

Moreover, the setting unit may further include an area setting unit that sets a use area of the storage, a diagnosis determination unit that determines only the use area as a diagnostic target when the use area is smaller than a non-use area and determines all the areas as a diagnostic target when the use area is greater than the non-use area, and a diagnosis unit that regularly diagnoses the diagnostic target.

According to another aspect of the present disclosure, there is provided a server-to-server sharing system using a module mounted in a server to share a block-level storage and resources, including: a first server unit equipped with a module mounted in a server to share a block-level storage and resources; and a second server unit equipped with a module mounted in a server to share a block-level storage and resources, and a Tx and a Rx of the first server unit and the second server unit are interconnected to each other, and an available storage volume of the first server unit or the second server unit is allocated to an available storage of another server unit according to a control command of a manager.

The server-to-server sharing system using a module mounted in a server to share a block-level storage and resources further includes a plurality of server units each equipped with a module mounted in a server to share a block-level storage and resources, and the Tx and the Rx of the server units may be interconnected to each other in a loop shape, and, thus, an available storage volume may be allocated to an available storage of another server unit according to a control command of the manager.

According to yet another aspect of the present disclosure, there is provided a server-to-server sharing system using a module mounted in a server to share a block-level storage and resources, including: a plurality of server units each equipped with a module mounted in a server to share a block-level storage and resources, and the server units may be connected to a SAN switch through a Fiber Channel, and, thus, an available storage volume may be allocated to an available storage of another server unit according to a control command of a manager.

The above-described aspects are provided by way of illustration only and should not be construed as liming the present disclosure. Besides the above-described embodiments, there may be additional embodiments described in the accompanying drawings and the detailed description.

According to the above-described embodiments of the present disclosure, a module mounted in a server to share a block-level storage and resources is provided and thus enables a block-level storage to be shared and an OS application to be operated in a single system.

Also, the module mounted in a server to share a block-level storage and resources is provided, and, thus, computing performance and storage capacity can be added.

According to the above-described embodiments of the present disclosure, a system using a module mounted in a server to share a block-level storage and resources is provided and thus enables an application to be driven by itself and a storage to be operated efficiently.

However, the effects to be obtained by the present disclosure are not limited to the above-described effects. There may be other effects to be obtained by the present disclosure.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

DETAILED DESCRIPTION

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The terms described herein are used only to explain specific embodiments, but do not limit the present disclosure. Herein, the term "host" refers to a server or an external server depending on the embodiment.

Hereinafter, a module mounted in a server to share a block-level storage and resources according to an embodiment of the present disclosure will be referred to as the present module 100 for convenience of explanation. Also, servers each equipped with the present module 100 will be referred to as a server 200 and an external server 300, respectively.

The present module 100 is a device using a SCSI protocol. The SCSI protocol refers to generally known communication standards and is obvious to a person with ordinary skill in the art, and, thus, a detailed explanation thereof will be omitted.

Figure 1:
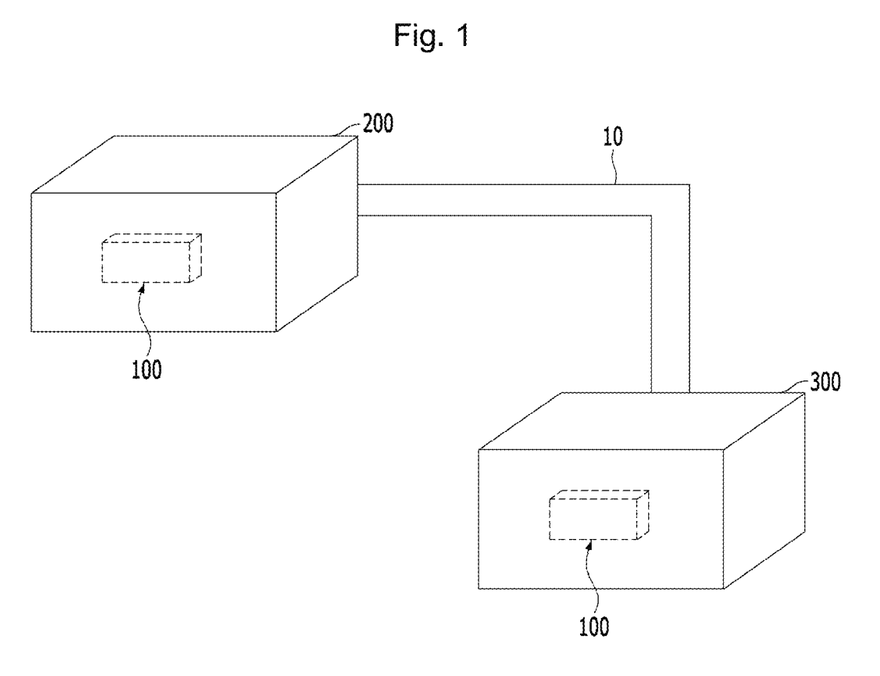
FIG. 1 is a schematic diagram illustrating a server-to-server sharing system using a module mounted in a server to share a block-level storage and resources according to an embodiment of the present disclosure.

FIG. 1 is a schematic diagram illustrating a server-to-server sharing system using the present module 100 according to an embodiment of the present disclosure.

Referring to FIG. 1, the server-to-server sharing system using the present module 100 according to an embodiment of the present disclosure may include the server 200, the external server 300 and a connection means 10. For example, each of the server 200 and the external server 300 may be equipped with the present module 100 therein.

Further, each of the server 200 and the external server 300 may be equipped with the present module 100 therein and configured to drive an application by itself. For example, each server may include a CPU, a memory, a driver, a main board, and the like and the configuration of any conventionally known or future developed server can be applied thereto. The configuration of the server is obvious to a person with ordinary skill in the art, and, thus, a detailed explanation thereof will be omitted.

A driving OS of the server 200 or the external server 300 according to an embodiment of the present disclosure may include, for example, Linux, Windows, VMware ESX and ESXi, Solaris, IBM AIX and HP/UX, but may not be limited thereto. A person with ordinary skill in the art may understand that any conventionally known or future developed OS may be applied thereto.

The server 200 and the external server 300 according to an embodiment of the present disclosure may be, for example, a Local SCSI initiator or a Remote SCSI initiator, or may be a SCSI target device, but may not be limited thereto. That is, if the server 200 and the external server 300 is initiators, they may be, for example, SCSI devices that initiates a request for service and task management to be processed by a SCSI target and receives a response to the service and task management from the SCSI target. As will be described in more detail below, if the server 200 is a SCSI initiator, the external server 300 may be a SCSI target. If the server 200 is a SCSI target, the external server 300 may be a SCSI initiator.

A conventional server cannot be used as a target device if it is not connected to a network. However, the server 200 and the external server 300 each using the present module 100 according to an embodiment of the present disclosure can be used not only as an initiator device, but also as a target device. In other words, the conventional server uses a SCSI protocol as an initiator and thus cannot be used as a target device, but can be used as a target device if it is equipped with the present module 100.

Also, the SCSI target device may be referred to as a target device, an object device or a target, and the SCSI initiator device may be referred to as an initiator device or an initiator, but may not be limited thereto.

A local SCSI initiator according to an embodiment of the present disclosure refers to a SCSI initiator present in the same local host as a subsystem, and a remote SCSI initiator refers to a SCSI initiator present in a remote host from the subsystem and configured to make a client connection through a target driver unit 140 which will be described below, but may not be limited thereto.

The connection means 10 connecting the server 200 and the external server 300 according to an embodiment of the present disclosure may include a Fiber Channel, but may not be limited thereto. It is obvious to a person with ordinary skill in the art that any conventionally known or future developed server-to-server connection means can be applied thereto.

Further, the connection means 10 may be connected to, for example, a Transmit Data (Tx) of the server 200 and a Received Data (Rx) of the external server 300 to connect the server 200 and the external server 300. Further, the connection means 10 may be connected to a Rx of the server 200 and a Tx of the external server 300 to connect the server 200 and the external server 300. Also, as will be described in more detail below, the Tx and Rx of the server 200 and the external server 300 are connected to a SAN switch to share a block-level storage and resources via a SAN. Further, the Tx of each of the server 200, the external server 300 and an additional external server 300 may be connected to the Rx of another server to share a block-level storage and resources.

Figure 2:
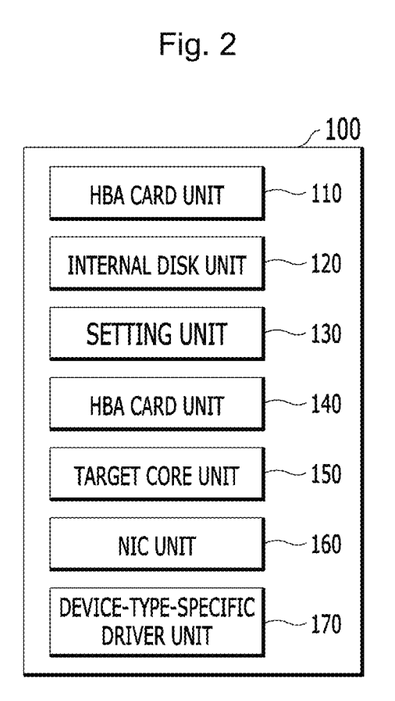
FIG. 2 is a block diagram illustrating the configuration of the present module according to an embodiment of the present disclosure.

FIG. 2 is a block diagram schematically illustrating the configuration of the present module 100 according to an embodiment of the present disclosure.

Referring to FIG. 2, the present module 100 according to an embodiment of the present disclosure may include a HBA card unit 110, an internal disk unit 120, a setting unit 130, a target driver unit 140, a target core unit 150, a NIC unit 160 and a device-type-specific driver unit 170.

The HBA card unit 110 may be a card mounted in a server for communication between the server and a device, i.e., a card for using another interface. In other words, the HBA card unit 110 may assist communication between the preset module 100 mounted in the server 200 and the external server 300 to be connected to the present module 100. Also, the present module 100 and the internal disk unit 120 which will be described in detail below may assist communication between a volume allocated by the setting unit 130 and the server 200.

The HBA card unit 110 according to an embodiment of the present disclosure may be a device configured to connect the external server 300 and the server 200 and assist smooth communication between them.

The HBA card unit 110 according to an embodiment of the present disclosure may include, for example, an adapter of Fiber Channel, SCSI, Infiniband, iSCSI, Hardware FCoE and Software FCoE. That is, the type of an adapter card of the HBA card unit 110 may be determined depending on the type of target transfer mode with respect to the external server 300. The HBA card is obvious to a person with ordinary skill in the art, and, thus, a detailed explanation thereof will be omitted.

The internal disk unit 120 may be a disk mounted in the server 200 to provide an OS dedicated storage and a built-in storage in the server 200. For example, the internal disk unit 120 may include a HDD (Hard Disk Drive), a SSD (Solid State Drive) and a SSHD (Solid State Hybrid Drive).

The internal disk unit 120 of the present module 100 according to an embodiment of the present disclosure may include a PATA hard disk, a SATA hard disk, a SAS hard disk, a RAM-based SSD, a flash memory-based SSD and a SSHD. More preferably, the flash memory-based SSD may be used. However, the internal disk unit 120 may not be limited thereto, and any conventionally known or future developed disk can be applied thereto.

Meanwhile, the internal disk unit 120 according to an embodiment of the present disclosure may further include a hybrid controller and a DDR controller combined with the hybrid controller, a plurality of DDR sets cobmined with the DDR controller and each including a plurality of DDRs, a HDD controller combined with the hybrid controller and configured with a HDD and a flash, and a plurality of HDD sets combined with the HDD controller and each including a plurality of HDDs. Herein, the plurality of HDDs may be configured including, for example, a flash and a HDD.

The internal disk unit 120 according to an embodiment of the present disclosure may include, for example, a serial attached small system interface/serial PCI Express type internal disk. The internal disk may adjust synchronization of data signals transmitted and received between a host and a memory disk during data communication between the host and the memory disk through a PCI Express interface to simultaneously support a low data processing speed for the host and a high data processing speed for the memory disk. Therefore, the internal disk may support data processing performance such that high-speed data processing can be performed to the maximum possible extent in any existing interface environment. However, the present disclosure is not limited thereto. In another embodiment, SAS/SATA techniques using SAS/SATA interface may be employed.

The PCI Express type internal disk included in the internal disk unit 120 according to an embodiment of the present disclosure may include a plurality of volatile semiconductor memories SSD, a HDD controller combined with the SSD, a host interface unit (for example, a PCI Express host) that interfaces between the SSD and the host and an auxiliary power supply unit configured to charge and maintain electric power by using electric power transmitted from the host through the host interface unit. Further, the internal disk may also include a backup storage unit configured to receive electric power from the auxiliary power supply unit and store data of the SSD when electric power transmitted from the host through the host interface is blocked or electric power transmitted from the host has failed. The backup storage unit may be configured as a low-speed non-volatile storage device such as a hard disk, but is not limited thereto.

Meanwhile, the SSD is an example of a memory and may include a plurality of volatile semiconductor memories, such as DDR, DDR2, DDR3, SDRAM and the like, for high-speed data input/output. The plurality of volatile semiconductor memories may be arrayed in parallel, but is not limited thereto.

Meanwhile, the host interface unit may interface between the host and the plurality of volatile semiconductor memories. For example, the host may be the host server 200 or the external server 300, but is not limited thereto.

Meanwhile, the setting unit 130 may adjust synchronization of data signals transmitted and received between the host interface unit of the internal disk unit 120 and the plurality of volatile semiconductor memories to control a data transmission/reception speed between the host interface unit and the memories.

The hybrid controller of the internal disk unit 120 according to an embodiment of the present disclosure may be combined with the DDR controller and the HDD controller configured with a HDD and a SSD. In this case, at least one DDR may be combined with the DDR controller, or at least one HDD or SSSD may be combined with the HDD controller. Meanwhile, the hybrid controller may include, for example, a high-speed data controller and a low-speed data controller. Herein, a data backup component may be combined with the hybrid controller.

Meanwhile, each of the DDR sets according to an embodiment of the present disclosure may include: a set of DDR memory disks; a hot-spare disk combined with the set of DDR memory disks; a DDR controller combined with the set of DDR memory disks; a RAID failure component combined with the DDR controller; and a data backup component combined with the DDR controller, but is not limited thereto. It is obvious to a person with ordinary skill in the art that this configuration can be equally applied to each HDD set.

The internal disk unit 120 according to an embodiment of the present disclosure may adjust synchronization of data signals transmitted and received between a host and a memory disk during data communication between the host and the memory disk to simultaneously support a low data processing speed for the host and a high data processing speed for the memory disk. Therefore, the internal disk unit 120 can support high performance of a high-speed data processing in any existing interface environment.

The setting unit 130 may be configured to allocate the storage space of the internal disk unit 120 in a plurality of volumes according to a control command of a server manager. The control command of the server manager may include, for example, a command to set the size of a volume to be allocated from the storage space.

Further, the setting unit 130 according to an embodiment of the present disclosure may set LUNs for the plurality of allocated volumes. The LUN refers to a single identifier number used to identify each device in a SCSI bus, and a logical device may be a final user, a file or application program. Preferably, the logical device may be a volume allocated from the storage space by the setting unit 130, but may not be limited thereto.

Meanwhile, the setting unit 130 according to an embodiment of the present disclosure may further include an area setting unit that sets one or more use areas for an allocated volume in order to check the state of the internal disk unit 120, a diagnosis determination unit that sets a diagnostic target by comparing the volume sizes of a use area and a non-use area, and a diagnosis unit that regularly diagnoses the diagnostic target.

The diagnosis determination unit according to an embodiment of the present disclosure may compare, for example, a use area set by the area setting unit with a non-use area to determine all the areas as a diagnostic target when the use area is greater than the non-use area and determine only the use area as a diagnostic target when the use area is smaller than the non-use area, but is not limited thereto.

As for the case where the use area is smaller than the non-use area, for example, if the size of the non-use area is greater than a minimum volume size, it is highly likely to register an additional volume in the non-use area, and, thus, data of the non-use area is checked in advance to avoid the occurrence of failure even when a volume is set for the non-use area.

On the contrary, as for the case where the use area is greater than the non-use area, it is less likely to register an additional volume in the non-use area, and, thus, the non-use area may not be determined to be subjected to data check and only an area with a volume being used may be determined to be subjected to data check in order to rapidly check data and reduce a load. Meanwhile, the diagnosis determination unit according to an embodiment of the present disclosure may compare, for example, a minimum use area volume, which is set by, for example, a manager of the server 200, with the non-use area to determine a diagnostic target, but is not limited thereto.

That is, the setting unit 130 according to an embodiment of the present disclosure may regularly determine a target area for data check and regularly check data of the determined target area. By regularly checking data, it is possible to reduce disk failures when the non-use area is used.

The target driver unit 140 may be a hardware or a logical driver serving as a target of the external server 300 if the server 200 or the external server 300 serves as an initiator and the server 200 is an initiator. That is, if the server 200 is an initiator, the target driver unit 140 of the external server 300 may be a hardware or a logical driver serving as a target.

Further, the target driver unit 140 may include a Linux hardware, a Windows hardware, or the like, but may not be limited thereto. In other words, the target driver unit 140 may accept a remote connection, transfer an incoming SCSI request to the target core unit 150 which will be described below and then transfer the incoming SCSI request to a target (device, etc.) that sends a SCSI response packet to the target core unit 150.

Furthermore, the target driver unit 140 may also be referred to as an object driver, a target driver, or the like.

The target driver unit 140 according to an embodiment of the present disclosure may implement a SCSI protocol and communicate with the external server 300. For example, the target driver unit 140 may accept a connection request including a request for service and task management of the server 200 or the external server 300 serving as an initiator, transfer the SCSI task request to a target core and transmit a SCSI response packet to the external server 300.

The SCSI task request according to an embodiment of the present disclosure may be composed of SCSI commands. For example, the SCSI task request may include SPC (SCSI Primary Commands), SBC (SCSI Block Commands), SSC (SCSI Streaming Commands) and MMC (SCSI Multi Media Commands).

A target session according to an embodiment of the present disclosure may be an object that describes the relationship between an initiator device and a target device through the target driver unit 140. For example, all commands of the server 200 or the external server 300 may be transferred from a target session to a target device. For easy understanding, as for a correction oriented protocol such as an iSCSI, the target session may be mapped to a TCP connection (and iSCSI session), but may not be limited thereto.

The target driver unit 140 according to an embodiment of the present disclosure may set the volumes allocated by the setting unit 130 according to the control command of the manager of the server 200 to a storage mode or a server mode. The control command of the server manager may be, for example, a storage mode that allows the volumes allocated by the setting unit 130 to be used as a storage of the external server 300. Further, the control command of the server manager may be, for example, a server mode that allows the allocated volumes to be used as a storage of the server 200.

In the server mode according to an embodiment of the present disclosure, the volumes allocated by the setting unit 130 from the storage of the internal disk unit 120 may be used for driving an OS of the server 200 or driving an application. Also, in the storage mode, the volumes allocated by the setting unit 130 from the storage of the internal disk unit 120 of the server 200 may be used for driving an OS of the external server 300 or for driving an application. However, the present disclosure may not be limited thereto.

Further, if the allocated volumes are set to the storage mode by the target driver unit 140, they may access the allocated volumes of the server 200 depending on control of the external server 300. Herein, the access may include, for example, input, output, storage and use of data, but may not be limited thereto. That is, if the allocated volumes of the server 200 are set to the storage mode, they may be used as a storage of the external server 300.

Meanwhile, the target driver unit 140 according to an embodiment of the present disclosure may further set the volumes allocated by the setting unit 130 according to the control command of the manager of the server 200 to an auto mode. In the auto mod, for example, if the available disk volume of the server 200 is small, when the server 200 drives an application at a remarkably decreased data processing speed reads and writes data in a small volume, and, thus, it is possible to suppress frequent failures caused by hard overload.

In the auto mode, for example, if an available storage of the server 200 is smaller than a predetermined value set by the manager of the server 200, the storage of the external server 300 is automatically set to the storage mode to allocate the storage of the external server 300 to the server 200, and, thus, the server 200 can access the storage of the external server 300.

According to another embodiment, in the auto mode, for example, if an available storage of the external server 300 is smaller than a predetermined value set by a manager of the external server 300, the storage of the server 200 is automatically set to the storage mode to allocate the storage of the server 200 to the external server 300, and, thus, the external server 300 can access the storage of the server 200.

Further, in the auto mode, for example, if an available storage of the server 200 is smaller than a predetermined value, a volume in the storage mode among the volumes of the server 200 is switched to the server mode and set as an available storage. Meanwhile, the manager of the sever 200 may set a maximum volume limit to which the auto mode is applied.

That is, in the auto mode, if an available storage of the server 200 is smaller than a predetermined value set by the manager, the storage of the external server 300 is set to the storage mode or a volume of the server 200 in the storage mode is switched to the server mode to expand the available storage of the server 200 and thus increase the data processing speed and suppress server overload. However, the present disclosure is not limited thereto.

The target core unit 150 may route section data of the target driver unit 140 and the internal disk unit 120 by processing SCSI commands depending on the storage mode, the server mode and the auto mode. For example, the target driver unit 140 may implement the SCSI protocol to communicate with the initiator and provide a local storage area to the target core unit 150 to implement the server 200 as a target device.

According to an embodiment of the present disclosure, the target core unit 150 may include a SCSI device, a block-level device, a file or a RAID controller. In other words, the target core unit 150 may transfer a SCSI command to a SCSI mid-level through the target driver unit 140.

According to an embodiment of the present disclosure, the target driver unit 140 of the present module 100 calls, for example, a target and registers a corresponding template at the target core unit 150. The target driver unit 140 may check an entry point through the template registered at the target core unit 150 and access the data, but may not be limited thereto.

The NIC unit 160 may be mounted in the present module 100 and connected to another system via a network. It is obvious that the present module 100 according to an embodiment of the present disclosure suggests communication in the lowest physical level rather than in a server-to-server network to solve the problem of traffic collision in the network. However, the NIC unit 160 may be provided as a means connecting a network for sharing a storage and resources and driving an OS of a system and an application.

Figure 3:
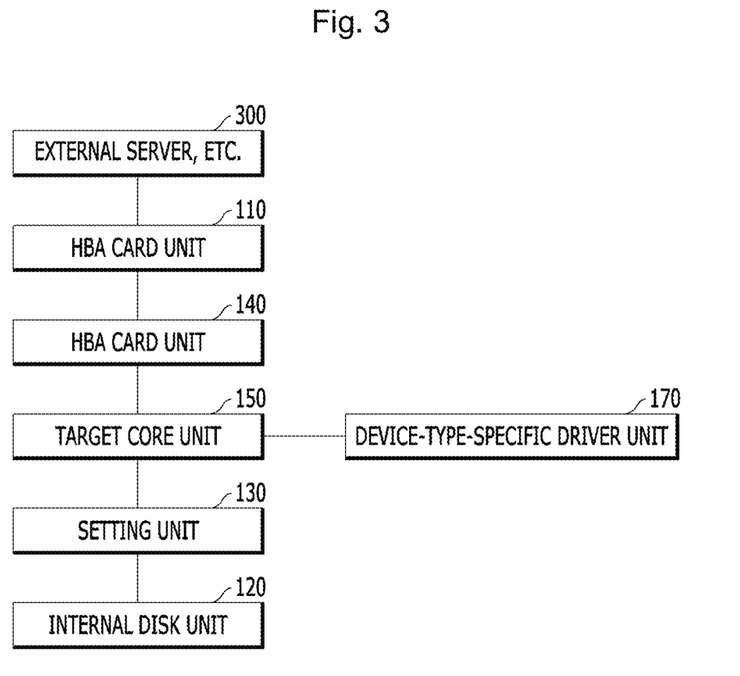
FIG. 3 is a diagram illustrating interactions between a driver of the present module and SCSI subsystems according to an embodiment of the present disclosure.

FIG. 3 is a diagram illustrating interactions between a driver of the present module 100 and SCSI subsystems according to an embodiment of the present disclosure.

Referring to FIG. 3, the external server 300 according to an embodiment of the present disclosure may be connected to the HBA card unit 110 through a Fiber Channel. The external server 300 (initiator) may transfer the SCSI command to the HBA card unit 110 of the module through the Fiber Channel and then transfer the transferred SCSI command to the target driver unit 140. The target driver unit 140 may register a LUN-set entry point of the volumes allocated by the setting unit 130 at the template, and the target core unit 150 may route data between the target driver unit 140 and the setting unit 130.

The device-type-specific driver unit 170 may analyze an incoming data request to the target core unit 150 and determine a parameter and thus specify various types of devices and assist data routing of the target core unit 150. The various types of devices may be, for example, the volumes allocated by the setting unit 130 and disks of the internal disk unit 120, but may not be limited thereto.

The device-type-specific driver unit 170 of the present module 100 according to an embodiment of the present disclosure may assist the analysis of the data request of the target core unit 150. Also, the device-type-specific driver unit 170 may be referred to as a device (backend) handle driver, a device-type-specific driver or a dev handler, but may not be limited thereto.

Figure 4:
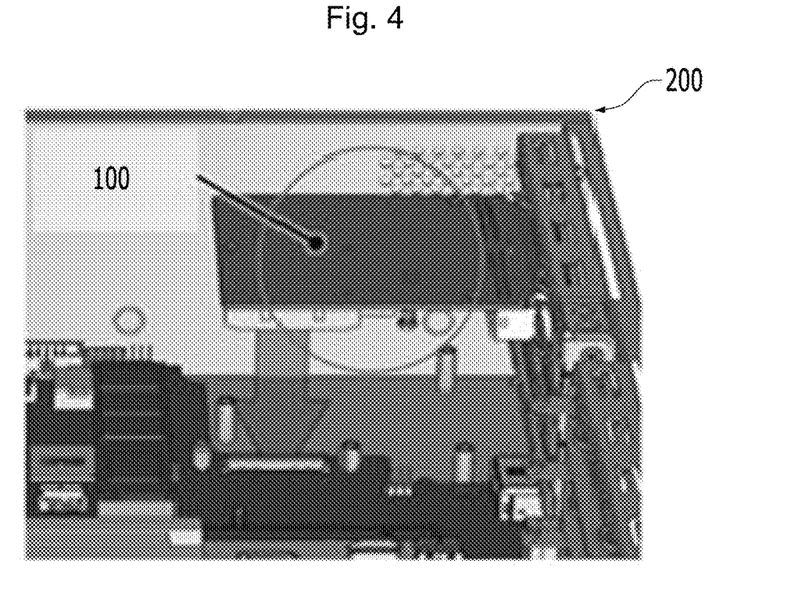
FIG. 4 is a diagram illustrating an example where the present module is mounted in a server according to an embodiment of the present disclosure.

FIG. 4 is a diagram illustrating an example where the present module 100 is mounted in a server according to an embodiment of the present disclosure.

Referring to FIG. 4, the present module 100 may be mounted in the server 200. For example, the present module 100 may be mounted in a main board of the server 200, but may not be limited thereto. Therefore, a person with ordinary skill in the art may easily understand that the present module 100 may be mounted not only in the server 200, but also outside the server 200.

Figure 5:
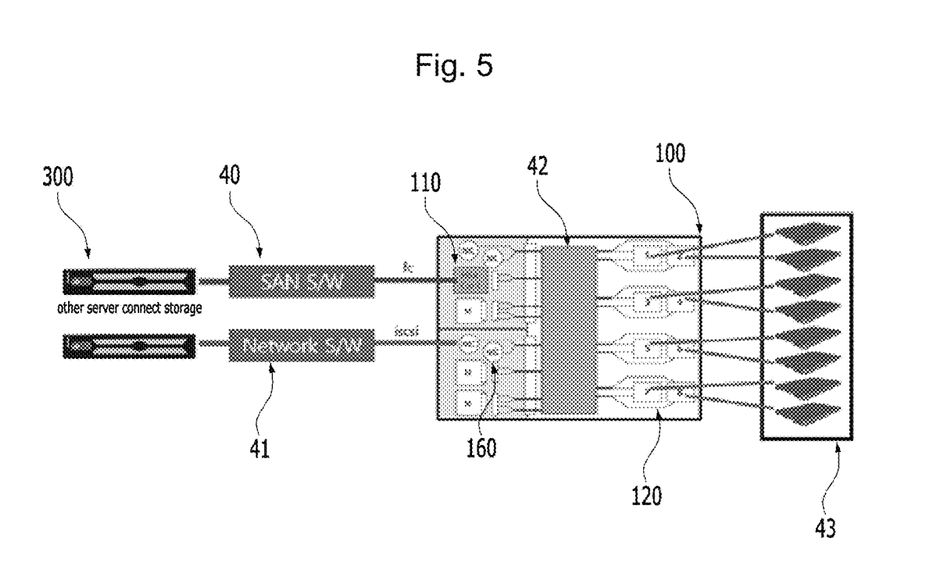
FIG. 5 is a diagram illustrating the internal configuration and connectivity of the present module according to an embodiment of the present disclosure.

FIG. 5 is a diagram illustrating the internal configuration and connectivity of the present module 100 according to an embodiment of the present disclosure.

Referring to FIG. 5, according to an embodiment of the present disclosure, the external server 300 and the present module 100 may be connected to each other through, for example, a Fiber Channel. Further, the external server 300 and the present module 100 may be connected to a SAN switch 40 through the Fiber Channel and connected to a Network S/W 41 through an iSCSI, but may not be limited thereto.

Further, referring to FIG. 5, the external server 300 and a central processing means 42 connected to each other by the connection between the Fiber Channel and the HBA card unit 110 and the connection between the iSCSI and the NIC unit 160 can communicate with each other. The central processing means 42 may include the setting unit 130, the target driver unit 140 the target core unit 150 and the device-type-specific driver unit 170.

According to an embodiment of the present disclosure, the internal disk unit 120 may be composed of a plurality of storage devices 43. The storage devices 43 may include, for example, a HDD (Hard Disk Drive), a SSD (Solid State Drive) and a SSHD (Solid State Hybrid Drive). Preferably, the storage devices 43 may be flash memory-based SSDs (Solid State Drives), but may not be limited thereto.

The internal disk unit 120 according to an embodiment of the present disclosure further includes a RAID card to increase the number of storage devices 43 to be mounted therein.

Figure 6:
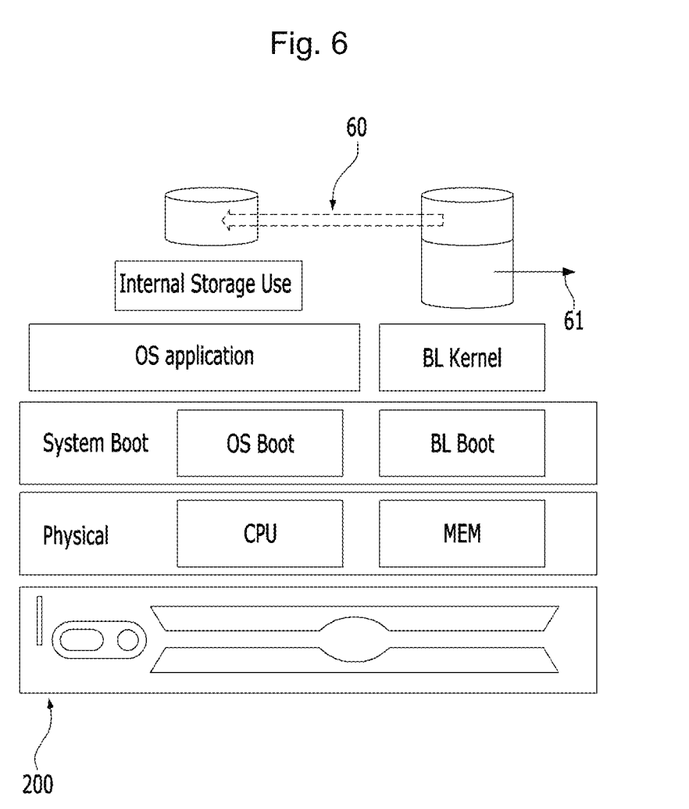
FIG. 6 is a conceptual diagram illustrating that the present module is mounted in a server and shares block levels according to an embodiment of the present disclosure.

FIG. 6 is a diagram provided to explain that the present module 100 is mounted in a server and shares a block-level storage and resources according to an embodiment of the present disclosure.

Referring to FIG. 6, according to an embodiment of the present disclosure, the server 200 equipped with the present module 100 may allocate the storage of the internal disk unit 120 in a plurality of volumes according to the control command of the server manager through the setting unit 130. Some of the plurality of volumes may be set to the server mode or the storage mode through the target driver unit 140.

According to an embodiment of the present disclosure, if the server manager gives a control command to use some of the plurality of volumes as a storage of the server 200, the present module 100 may allocate 60 some of the plurality of volumes as a storage of the server 200. Further, if the server manager gives a control command to use some of the plurality of volumes as a storage of the external server 300, the present module 100 may allocate 61 some of the plurality of volumes as a storage of the external server 300. In the case of allocation 61 to the external server 300, the external server 300 may use the allocated storage as its own storage depending on control of the external server 300, but may not be limited thereto.

Specifically, in the sever mode, the plurality of volumes allocated by the setting unit 130 according to the control command of the server manager may be routed to the target driver unit 140 by the target core unit 150, and the external server 300 may use a storage through the HBA card unit 110.

In the storage mode, the plurality of volumes allocated by the setting unit 130 according to the control command of the server manager may be routed to an OS driver by the target core unit 150 and may provide a storage of the server 200, but may not be limited thereto.

Figure 7:
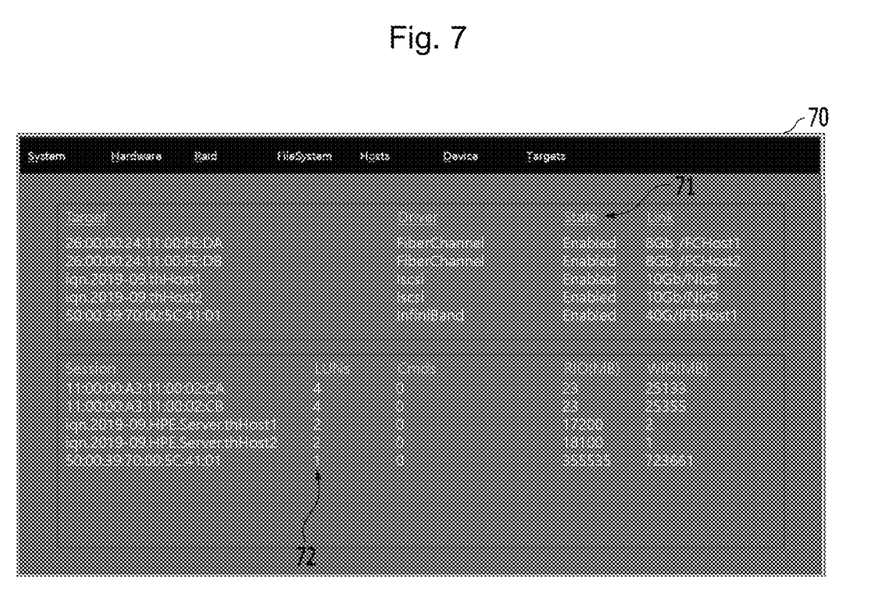
FIG. 7 is a conceptual diagram illustrating an example where the present module is mounted in a server and switches a mode of the server or controls a volume according to an embodiment of the present disclosure.

FIG. 7 is a conceptual diagram illustrating an example where the present module 100 is mounted in a server and switches a mode of the server or controls a volume according to an embodiment of the present disclosure.

Referring to FIG. 7, a logical volume manager (LVM) 70 efficiently manages control commands of the server manager to allocate a storage of a server in a plurality of volumes or switch a mode of the allocated volumes. For example, a configuration 71 that shows an active state of a server mode for sharing the storage with the external server 300 may have a server mode in an enabled state and a storage mode for sharing the storage with the server 200 in a disabled state, but may not be limited thereto. The present drawing is an exemplary drawing of an embodiment of the present disclosure.

Further, the logical volume manager (LVM) 70 may set LUNs for the plurality of volumes allocated by the setting unit 130 according to the control command of the server manager. Specifically, the logical volume manager (LVM) 70 may enable the setting unit 130 to set LUNs according to the control command of the server manager. The LUN is obvious to a person with ordinary skill in the art, and, thus, a detailed explanation thereof will be omitted.

The present module 100 according to an embodiment of the present disclosure may be a single platform mounted in a server. Therefore, it is possible to reduce complexity and it is easy to maintain and manage the present module 100. If necessary, a RAID card may be mounted in the internal disk unit 120 to further provide a storage device 43 and expand the present module 100. Further, a storage device 43 can be added without terminating the server 200 based on an architecture which will be described below.

Further, the present module 100 includes the internal disk unit 120 and thus can be connected to another system by using a SAN switch or a Network switch connected thereto in addition to a block-level host.

Furthermore, the present module 100 is mounted in a server to provide basic computing power, and shares only resources with a necessary CPU, and, thus, a substantial disk IO may be stored as a block level in a storage space of the internal disk unit 120 through the HBA card unit 110. That is, the expandability and computing power of basic block levels can be shared. However, the present disclosure may not be limited thereto.

Also, the present module 100 according to an embodiment of the present disclosure is mounted in, for example, a server and thus can basically drive an appliance inside the server and can share an extra storage with an external server or system. Therefore, a storage can be efficiently used.

According to an embodiment of the present disclosure, the architecture of the server 200 equipped with the present module 100 can be booted to a plug-in flash drive in its own system, and the whole configuration (binary, file, directory, etc.) can be loaded into a memory at boot time. Further, if the flash drive does not work, the system may continue to normally work until the disabled flash drive can be handled (replaced).

Also, the configuration, files and set-up required to use the system can be automatically synchronized with a file system, and shutdown and restart time or file system and disk size logs can be stored in its own flash drive.

Also, a boot loader installed therein may be driven and an automatic block-level storage kernel may be loaded. Thereafter, a temporary file system (RAM) is initialized and then, a route image can be extracted by the newly created temporary file system. Then, storage controller control may be transferred to an initiator kernel and a rc/init script may be executed. However, the present disclosure may not be limited thereto.

A server system using the present module 100 according to an embodiment of the present disclosure may be a system basically configured to support a SAN (server providing a block storage) block. That is, it is a software that can convert all servers into a SAN system, and this method may be referred to as a software-based storage, but may not be limited thereto.

Also, the server 200 equipped with the present module 100 does not need a special hardware and is equipped with an OS and can drive an application. Further, the server 200 can be combined with another OS storage layer.

Figure 8:
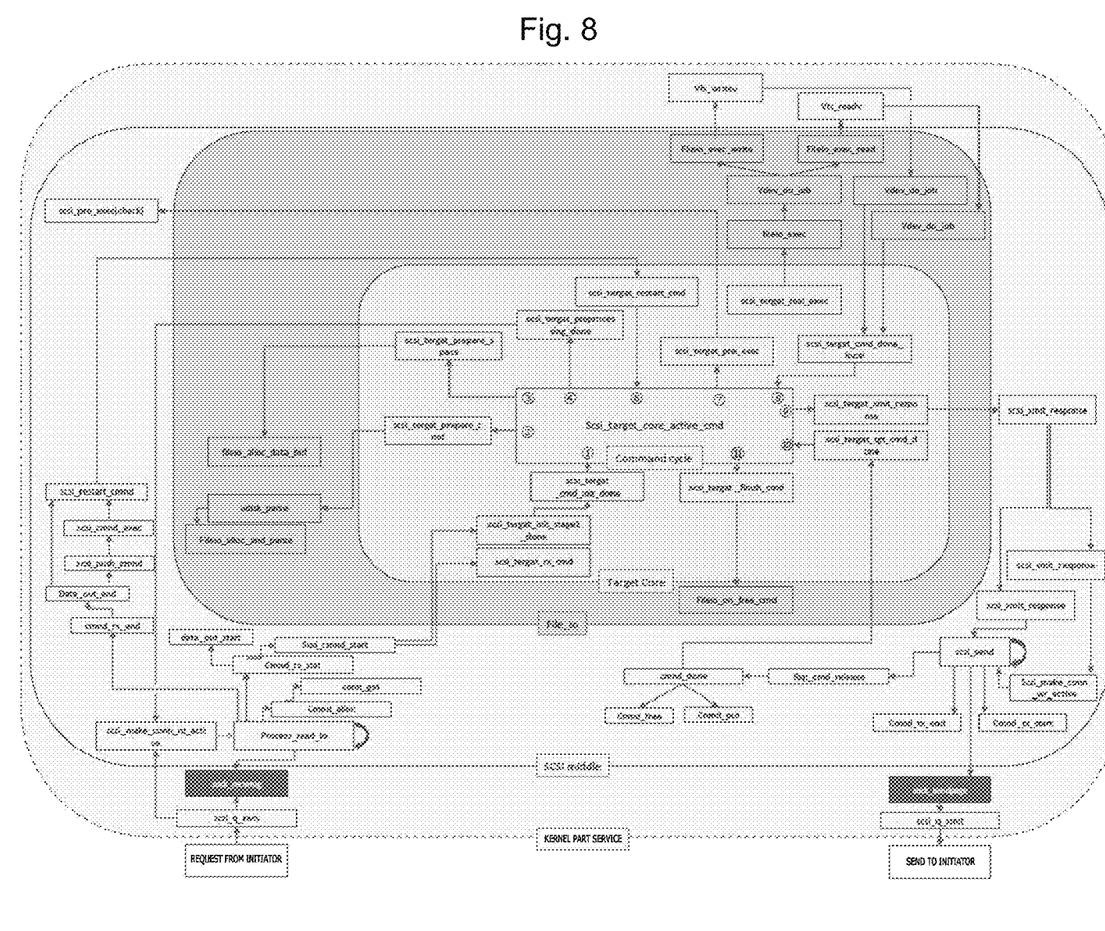
FIG. 8 is a block diagram illustrating a usage definition of the present module according to an embodiment of the present disclosure.

FIG. 8 is a block diagram illustrating a usage definition of a module mounted in a server to share a block-level storage and resources according to an embodiment of the present disclosure.

Referring to FIG. 8, processes among the target driver unit 140, the target core unit 150 and the setting unit 130 according to a task command requested from an initiator, i.e., the server 200 or the external server 300 can be seen. However, this is just an example and does not limit the present disclosure.

A server-to-server sharing system using the present module 100 according to an embodiment of the present disclosure includes a first server unit equipped with a module mounted in a server to share a block-level storage and resources and a second server unit equipped with a module mounted in a server to share a block-level storage and resources, and Tx and Rx of the first server unit and the second server unit are interconnected to each other, and an available storage volume of the first server unit or the second server unit may be allocated to an available storage of another server unit according to a control command of a manager.

Figure 9:
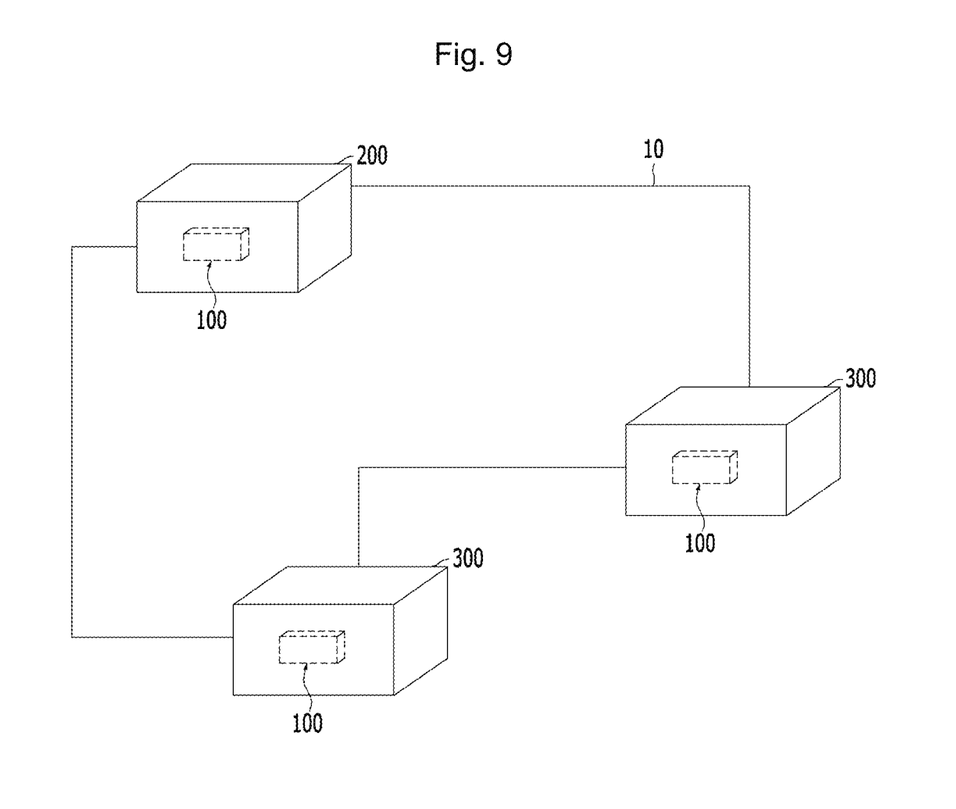
FIG. 9 is a schematic diagram illustrating the configuration of a system sharing a storage by connecting servers each using the present module in a loop shape according to an embodiment of the present disclosure.

FIG. 9 is a schematic diagram illustrating the configuration of a system sharing a storage by connecting servers each using the present module 100 in a loop shape according to an embodiment of the present disclosure.

Referring to FIG. 9, a system sharing a storage by connecting servers each using the present module 100 in a loop shape according to an embodiment of the present disclosure includes a first server unit equipped with a module mounted in a server to share a block-level storage and resources, a second server unit equipped with a module mounted in a server to share a block-level storage and resources and a plurality of server units each equipped with a module mounted in a server to share a block-level storage and resources, and Tx and Rx of the server units may be interconnected to each other in a loop shape, and, thus, an available storage volume may be allocated to an available storage of another server unit according to a control command of the manager. Although FIG. 9 illustrates a total of three server units as an example, a person with ordinary skill in the art may understand that a plurality of server units may be connected to each other.

Also, for example, if there are a total of three server units which are referred to as a first server unit, a second server unit and a third server unit, respectively, the interconnection between Tx and Rx of the server units may mean that a Tx of the first server unit is connected to a Rx of the second server unit, a Tx of the second server unit is connected to a Rx of the third server unit, and a Tx of the third server unit is connected to a Rx of the first server unit.

In this case, the first server unit may access a storage of the third server unit without network connection. The same may apply when a plurality of server units is present.

Figure 10:
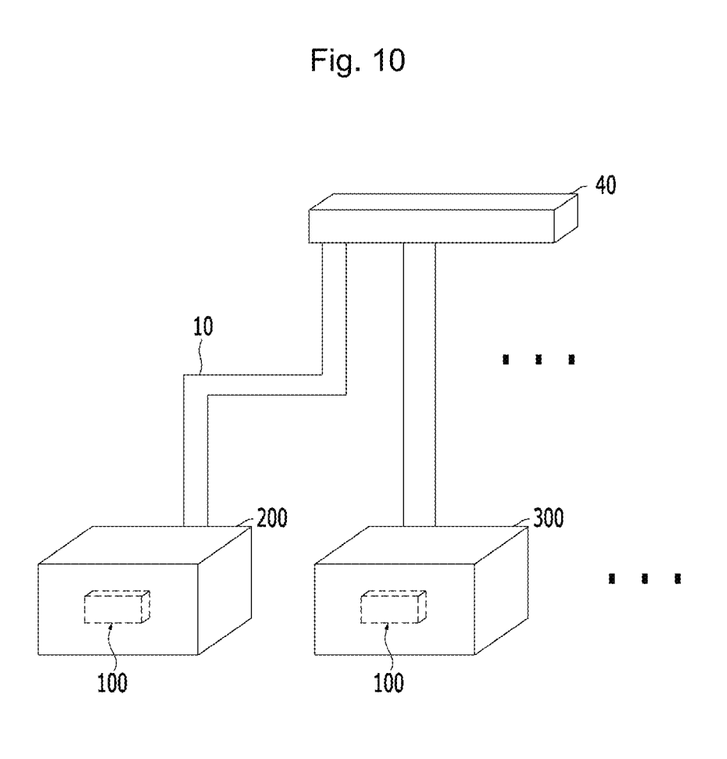
FIG. 10 is a schematic diagram illustrating the configuration of a system sharing a storage by connecting servers each using the present module through a SAN switch according to an embodiment of the present disclosure.

FIG. 10 is a schematic diagram illustrating the configuration of a system sharing a storage by connecting servers each using the present module 100 through a SAN switch according to an embodiment of the present disclosure.

Referring to FIG. 10, a system sharing a storage by connecting servers each using the present module 100 through a SAN switch according to an embodiment of the present disclosure includes a plurality of server units each equipped with a module mounted in a server to share a block-level storage and resources, and the server units may be connected to the SAN switch 40 through a Fiber Channel, and, thus, an available storage volume may be allocated to an available storage of another server unit according to a control command of a manager.

That is, if there is an increase in number of servers connected in a loop shape and each equipped with the present module 100 according to an embodiment of the present disclosure, the SAN Switch 40 may be used to enable more servers to share a storage. However, the present disclosure may not be limited thereto.

The SAN switch 40 is obvious to a person with ordinary skill in the art, and, thus, a detailed explanation thereof will be omitted.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Module mounted in a server to share a block-level storage and resources
110: HBA card unit
120: Internal disk unit
130: Setting unit
140: Target driver unit
150: Target core unit
160: NIC unit
170: Device-type-specific driver unit
200: Server
300: External server

We claim:

1. A module mounted in a server to share a block-level storage and resources, comprising:
a HBA card unit for connection to an external server;
an internal disk unit in which a plurality of internal disks is mounted and which provides a single storage space inside a server;
a setting unit configured to allocate the single storage space of the internal disk unit into a plurality of volumes according to a control command of a server manager;
a target driver unit configured to implement a SCSI protocol, communicate with the external server connected to the HBA card unit and set the volumes to a storage mode or a server mode according to a control command of the server manager, or set one part of the volumes to a server mode and the other part of the volumes to a storage mode, wherein the storage mode is a mode that allows the volumes to be used as a storage of the external server according to a control command of the server manager, and the server mode is a mode that allows the volumes to be used as a storage inside the server; and
a target core unit configured to route data of the internal disk unit and the target driver unit by processing a SCSI command depending on the storage mode or the server mode,
wherein the target driver unit is further configured to be able to switch the volumes from the server mode to the storage mode, which enables access to data depending on control of the external server, according to a control command of the server manager, or according to a control command of an external server manager.

2. The module mounted in a server to share a block-level storage and resources of claim 1,
wherein the setting unit allocates a volume of the internal disk unit, which is targeted by a SCSI protocol, at a block level and sets LUNs for the allocated volumes.

3. The module mounted in a server to share a block-level storage and resources of claim 1,
wherein the internal disk unit further includes a RAID card to increase the number of internal disks to be mounted.

4. The module mounted in a server to share a block-level storage and resources of claim 3,
wherein a transfer protocol between the HBA card and the external server is any one of Fiber Channel Target, Infiniband Target, iSCSI Target, Hardware FCoE Target, ISCSI over TCP, IP, SRP over Infiniband, iSER over IB, RoCE, iWARP and Software FCoE Target.

5. The module mounted in a server to share a block-level storage and resources of claim 4, further comprising:
a NIC unit for network connection to another system.

6. The module mounted in a server to share a block-level storage and resources of claim 5, further comprising:
a device-type-specific driver unit configured to assist data processing by analyzing a data request, determining a parameter and specifying the type of a device.

7. The module mounted in a server to share a block-level storage and resources of claim 6,
wherein the target core unit is any one of a SCSI device, a block device, a file and a RAID controller.

8. The module mounted in a server to share a block-level storage and resources of claim 1,
wherein the target driver unit further sets the volumes to an auto mode according to a control command of the server manager, and
the auto mode is a mode in which the volumes are set to the storage mode or the server mode depending on an available storage of the server or the external server.

9. The module mounted in a server to share a block-level storage and resources of claim 1,
wherein the setting unit further includes:
an area setting unit that sets a use area of the storage;
a diagnosis determination unit that determines only the use area as a diagnostic target when the use area is smaller than a non-use area and determines all the areas as a diagnostic target when the use area is greater than the non-use area; and
a diagnosis unit that regularly diagnoses the diagnostic target.

10. A server-to-server sharing system using a module of claim 1, comprising:
a first server unit equipped with a module mounted in a server to share a block-level storage and resources; and
a second server unit equipped with a module mounted in a server to share a block-level storage and resources,
wherein a Tx and a Rx of the first server unit and the second server unit are interconnected to each other, and
an available storage volume of the first server unit or the second server unit is allocated to an available storage of another server unit according to a control command of a manager.

11. The server-to-server sharing system of claim 10, further comprising:
a plurality of server units each equipped with a module mounted in a server to share a block-level storage and resources,
wherein the Tx and the Rx of the server units are interconnected to each other in a loop shape, and, thus, an available storage volume is allocated to an available storage of another server unit according to a control command of the manager.

12. A server-to-server sharing system using a module of claim 1, comprising:

a plurality of server units each equipped with a module mounted in a server to share a block-level storage and resources, wherein the server units are connected to a SAN switch through a Fiber Channel, and, thus, an available storage volume is allocated to an available storage of another server unit according to a control command of a manager.

* * * * *